US010531087B2

(12) United States Patent
Yokomizo

(10) Patent No.: US 10,531,087 B2
(45) Date of Patent: Jan. 7, 2020

(54) IMAGE PROCESSING APPARATUS, IMAGING APPARATUS, AND IMAGE PROCESSING METHOD

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/224,326

(22) Filed: Jul. 29, 2016

(65) Prior Publication Data
US 2017/0041608 A1 Feb. 9, 2017

(30) Foreign Application Priority Data
Aug. 3, 2015 (JP) ................................. 2015-153188

(51) Int. Cl.
*H04N 19/124* (2014.01)
(52) U.S. Cl.
CPC ................................ *H04N 19/124* (2014.11)
(58) Field of Classification Search
CPC .. H04N 19/105; H04N 19/139; H04N 19/159; H04N 19/176; H04N 19/523; H04N 19/126; H04N 19/124; H04N 19/198; H04N 19/15; H04N 19/137; H04N 21/23406; H04N 21/23424; H04N 21/44004; H04N 21/194; H04N 21/854; H04N 21/15; H04N 21/44016; H04N 19/146; H04N 11/02; H04N 19/17; H04N 7/13; H04N 19/649
See application file for complete search history.

(56) References Cited

U.S. PATENT DOCUMENTS

| 5,237,410 | A | * | 8/1993 | Inoue | H04N 19/503 375/240.12 |
| 5,978,515 | A | * | 11/1999 | Katata | H04N 19/46 375/E7.081 |
| 6,055,330 | A | * | 4/2000 | Eleftheriadis | G06T 9/007 382/154 |
| 6,256,423 | B1 | * | 7/2001 | Krishnamurthy | H04N 19/30 375/E7.083 |
| 6,278,735 | B1 | * | 8/2001 | Mohsenian | H04N 19/176 375/240 |

(Continued)

FOREIGN PATENT DOCUMENTS

JP 6-284395 A 10/1994

*Primary Examiner* — Dramos Kalapodas
(74) *Attorney, Agent, or Firm* — Canon U.S.A., Inc. IP Division

(57) ABSTRACT

An image processing apparatus includes a setting unit configured to set, within an image, a specified region which is associated with a set quantization parameter, a determination unit configured to determine a quantization parameter to be used in encoding of an image of an outside of the specified region, in such a manner that a generated code amount obtained by encoding the image becomes a target code amount, and a changing unit configured, in a case in which the specified region is changed when the determination unit is activated, to change a quantization parameter of the image to a predetermined fixed value in such a manner that an image quality of the image becomes lower than a previous image quality obtained from a quantization parameter set for the specified region before the change.

20 Claims, 9 Drawing Sheets

(56) References Cited

U.S. PATENT DOCUMENTS

| | | | | |
|---|---|---|---|---|
| 6,539,124 B2* | 3/2003 | Sethuraman | ............ | H04N 19/50 375/240.03 |
| 6,711,298 B1* | 3/2004 | Amonou | .................... | G06T 9/20 375/E7.042 |
| 6,731,810 B1* | 5/2004 | Miura | ...................... | G06T 9/008 375/E7.228 |
| 6,763,067 B2* | 7/2004 | Hurst | ............... | H04N 21/23406 375/240.03 |
| 6,909,810 B2* | 6/2005 | Maeda | ................. | H04N 19/196 375/E7.042 |
| 7,127,117 B2* | 10/2006 | Sano | ........................ | G06T 9/007 382/240 |
| 7,308,029 B2* | 12/2007 | Boice | .................. | H04N 19/176 375/240 |
| 7,369,705 B2* | 5/2008 | Kondo | ................. | H04N 19/172 375/E7.093 |
| 8,115,812 B2* | 2/2012 | Yoshida | ............ | G08B 13/19641 348/143 |
| 8,243,797 B2* | 8/2012 | Lin | ....................... | H04N 19/147 375/240.03 |
| 8,422,565 B2* | 4/2013 | Fukuhara | ............... | H04N 5/232 375/240.29 |
| 8,634,458 B2* | 1/2014 | Ishii | ......................... | H04N 5/77 348/231.99 |
| 9,071,842 B2* | 6/2015 | Li | ........................ | H04N 19/115 |
| 9,118,912 B2* | 8/2015 | Bhagavathy | .......... | H04N 19/172 |
| 9,350,989 B2* | 5/2016 | Hiraoka | ................ | H04N 19/176 |
| 9,538,191 B2* | 1/2017 | Hiraoka | ................ | H04N 19/176 |
| 9,930,346 B2* | 3/2018 | Thirumalai | ........... | H04N 19/115 |
| 9,936,203 B2* | 4/2018 | Jacobson | ................ | H04N 19/14 |
| 2005/0024487 A1* | 2/2005 | Chen | .................... | H04N 19/172 348/14.13 |

* cited by examiner

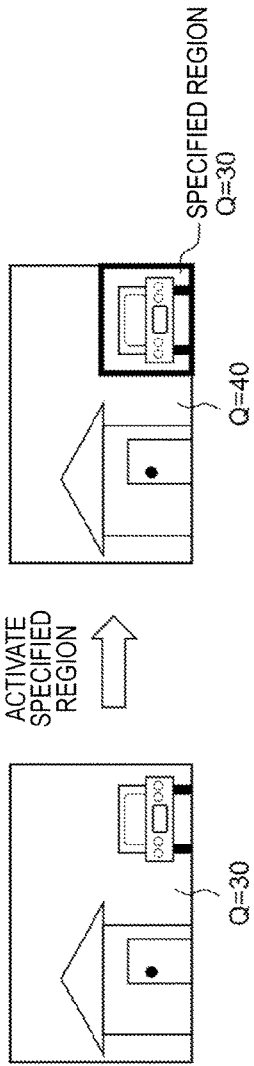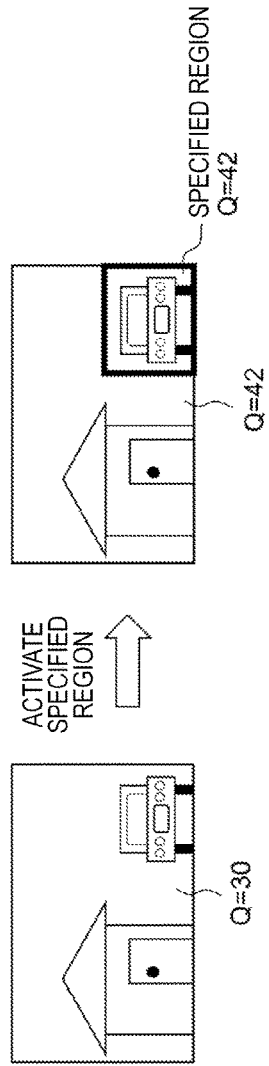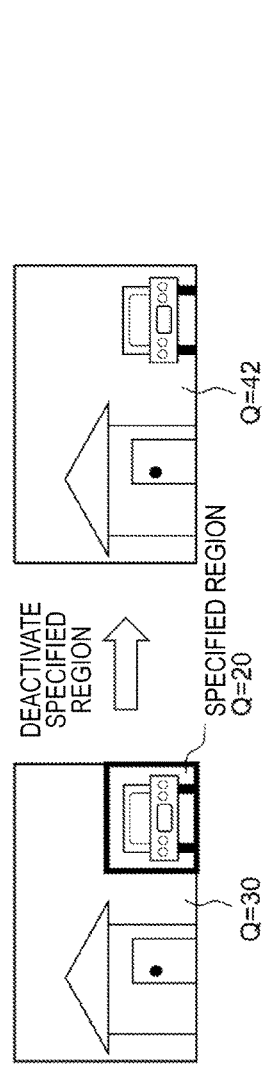

IMAGE PROCESSING APPARATUS, IMAGING APPARATUS, AND IMAGE PROCESSING METHOD

BACKGROUND OF THE INVENTION

Field of the Invention

The present invention relates to an image processing apparatus, an imaging apparatus, and an image processing method that are for encoding an image.

Description of the Related Art

In recent years, in the field of video encoding, there has been known a technique of varying image quality by varying a compression ratio for each region within an image. Japanese Patent Laid-Open No. 6-284395 discloses reducing data capacity without deteriorating video quality, by varying quantization processing between the inside and the outside of a region of a central portion of an image in such a manner that the image quality of a video of an image central portion becomes high and the image quality of a video of a peripheral portion becomes low.

Meanwhile, there has been conventionally known, as code amount control, the control of determining a quantization parameter to be applied to the next image, in such a manner that a generated code amount is equal to a target code amount, based on a code amount obtained until just before the parameter determination. The code amount control is referred to as "Constant Bit Rate control (CBR control)" because an image is encoded at a constant bit rate (CBR).

In some cases, so-called "region-based image quality control" is performed during the CBR control. More specifically, in the region-based image quality control, the image quality of the inside of a specified region is made higher than the image quality of the outside of the specified region. In such cases, a bit rate is kept constant while varying image quality between the inside and the outside of the specified region. Nevertheless, if the size of the specified region rapidly changes by changing an imaging direction of a camera, for example, a bit rate may instantaneously become very large even during the CBR control.

SUMMARY OF THE INVENTION

In view of the foregoing, the present invention addresses an issue of preventing a rapid increase in bit rate that is caused by large deviation of a generated code amount from a target code amount, in the case of executing the region-based image quality control during the CBR control.

For solving the above-described issue, an image processing apparatus according to an aspect of the present invention includes a setting unit configured to set, within an image, a specified region which is associated with a set quantization parameter, a determination unit configured to determine a quantization parameter to be used in encoding of an image of an outside of the specified region, in such a manner that a generated code amount obtained by encoding the image becomes a target code amount, and a changing unit configured, in a case in which the specified region is changed when the determination unit is activated, to change a quantization parameter of the image to a predetermined fixed value in such a manner that an image quality of the image becomes lower than a previous image quality obtained from a quantization parameter set for the specified region before the change.

Further features of the present invention will become apparent from the following description of exemplary embodiments (with reference to the attached drawings).

BRIEF DESCRIPTION OF THE DRAWINGS

FIGS. 8A to 8C are diagrams each illustrating an example of a specified region.

DESCRIPTION OF THE EMBODIMENTS

Exemplary embodiments of the present invention will be described in detail below with reference to the attached drawings.

In addition, the exemplary embodiments described below each serve as an example of an implementation tool of the present invention, and are to be appropriately modified or changed depending on the configuration and various conditions of an apparatus to which the present invention is to be applied. The present invention is not limited to the following exemplary embodiments.

First Exemplary Embodiment

In the present exemplary embodiment, the description will be given of a monitoring system that can transmit an image from a network camera to a client apparatus on a network.

Figure 1:
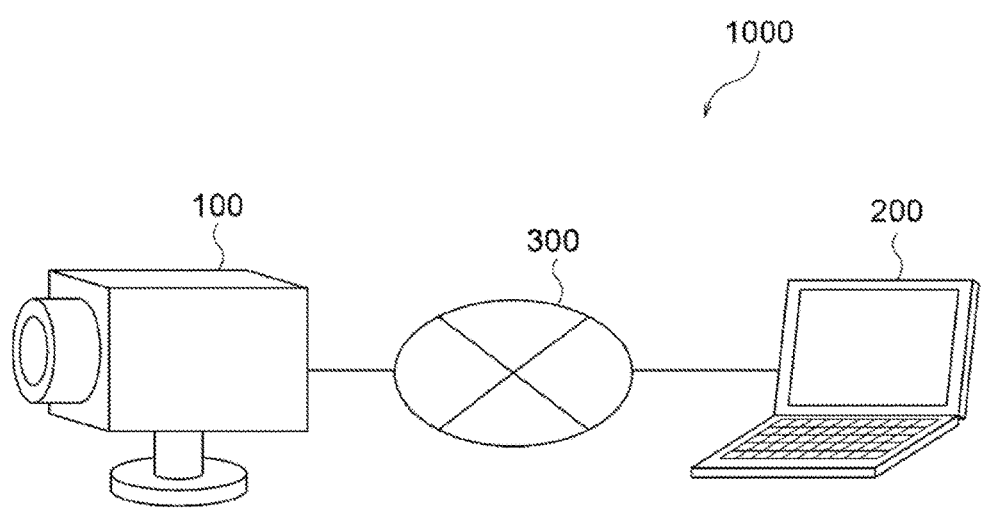
FIG. 1 illustrates a network configuration example of a monitoring system according to the present exemplary embodiment.

FIG. 1 illustrates a network configuration example of a monitoring system 1000 according to the present exemplary embodiment. The monitoring system 1000 includes a network camera (hereinafter, simply referred to as "camera") 100 and a client apparatus 200. The camera 100 and the client apparatus 200 are connected via a network 300 so that they can communicate with each other. The network 300 includes a plurality of routers, a switch, a cable, and the like that are compliant with a communication standard of the Ethernet (registered trademark), for example. In addition, there is no restriction on the communication standard, size, and configuration of the network 300 so long as the network 300 is configured to enable communication between the camera 100 and the client apparatus 200. The network 300 may be implemented by the Internet, a wired local area network (LAN), a wireless LAN, a wide area network (WAN), or a combination of these.

The camera 100 is an imaging apparatus for capturing an image of a predetermined monitoring target range. In the present exemplary embodiment, the camera 100 is a Pan Tilt Zoom camera (PTZ camera) having a pan mechanism, a tilt mechanism, and a zoom mechanism. In addition, the camera 100 is not limited to the PTZ camera. In addition, the camera 100 may support the Power over Ethernet (PoE), or may be configured to be supplied with power via a LAN cable.

The client apparatus 200 is formed by a terminal apparatus such as a personal computer (PC), a smartphone, and a tablet-type PC, and can transmit various commands to the camera 100. Commands transmitted to the camera 100 include commands for changing an imaging direction and a viewing angle of the camera 100, a command for changing an imaging parameter, a command relating to image processing, and a command for starting the transmission of an image.

In response to the commands for changing an imaging direction and a viewing angle that have been received from the client apparatus 200, the camera 100 changes an imaging direction and a viewing angle. In addition, in response to the command for starting the transmission of an image, the camera 100 transmits an image to the client apparatus 200. The client apparatus 200 receives the image transmitted by the camera 100 in response to the above-described command for starting the transmission of an image, and performs display control of presenting the received image to a user (e.g., surveillant) using the client apparatus 200.

Figure 2:
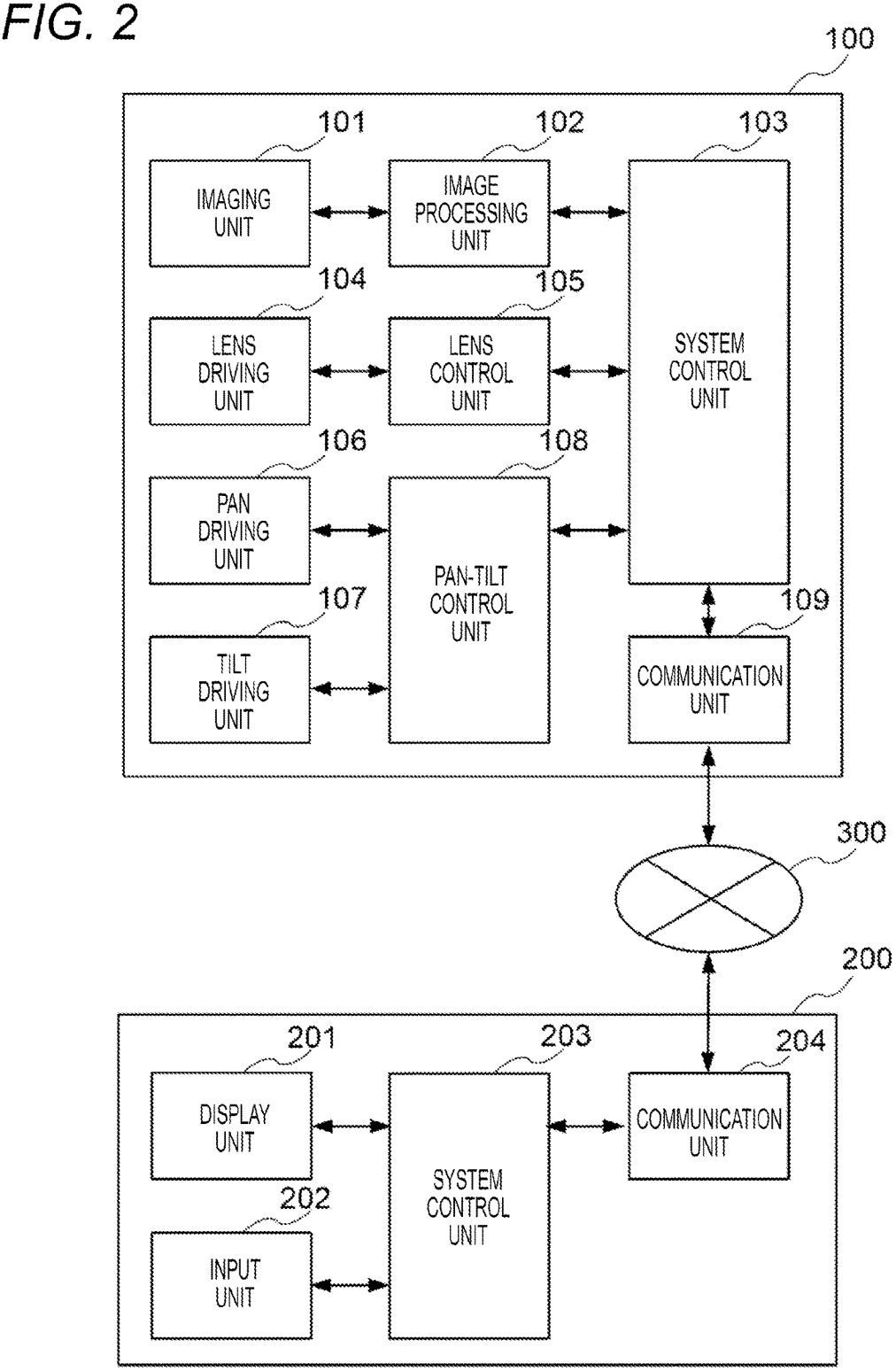
FIG. 2 is a block diagram illustrating a configuration example of a camera and a client apparatus.

FIG. 2 is a block diagram illustrating a configuration example of the camera 100 and the client apparatus 200. As illustrated in FIG. 2, the camera 100 includes an imaging unit 101, an image processing unit 102, a system control unit 103, a lens driving unit 104, a lens control unit 105, a pan driving unit 106, a tilt driving unit 107, a pan-tilt control unit 108, and a communication unit 109. In addition, the client apparatus 200 includes a display unit 201, an input unit 202, a system control unit 203, and a communication unit 204. In addition, the communication unit 109 of the camera 100 and the communication unit 204 of the client apparatus 200 are connected so that they can communicate with each other via the network 300.

First, the configuration of the camera 100 and the functions of the respective units in the camera 100 will be described.

The imaging unit 101 includes a lens and an image sensor such as a complementary metal oxide semiconductor (CMOS) and a charge coupled device (CCD), and captures an image of a subject. In addition, the imaging unit 101 performs processing of converting an optical image formed on an imaging plane, into a digital electrical signal through photoelectric conversion. The image processing unit 102 performs predetermined image processing on the signal photoelectrically-converted by the imaging unit 101. Examples of the above-described image processing include white balance processing, sharpness processing, and tone conversion processing.

The system control unit 103 encodes the image having been subjected to the image processing performed by the image processing unit 102, and outputs a generated image (encoded data) to the communication unit 109 so as to deliver the generated image to the client apparatus 200. The details of encoding processing will be described later.

In addition, the system control unit 103 analyzes a command received from the client apparatus 200 via the communication unit 109, and performs processing according to the command. Specifically, according to the received command, the system control unit 103 instructs the image processing unit 102 to change an image processing parameter, instructs the lens control unit 105 to control zooming and focusing, and instructs the pan-tilt control unit 108 to perform pan and tilt operations. Furthermore, the system control unit 103 issues a setting change instruction in the encoding processing described later.

The lens driving unit 104 includes a driving system of a focusing lens and a zoom lens, and a motor serving as a drive source thereof. The operation of the lens driving unit 104 is controlled by the lens control unit 105. The lens control unit 105 controls the lens driving unit 104 based on an instruction issued by the system control unit 103. The pan driving unit 106 includes a mechanical driving system for performing a pan operation, and a motor serving as a drive source thereof. The operation of the pan driving unit 106 is controlled by the pan-tilt control unit 108. In addition, the tilt driving unit 107 includes a mechanical driving system for performing a tilt operation, and a motor serving as a drive source thereof. The operation of the tilt driving unit 107 is controlled by the pan-tilt control unit 108. The pan-tilt control unit 108 controls the pan driving unit 106 and the tilt driving unit 107 based on an instruction issued by the system control unit 103.

The communication unit 109 receives various commands transmitted from the communication unit 204 of the client apparatus 200 via the network 300, and transmits the received commands to the system control unit 103. In addition, based on an instruction issued by the system control unit 103, the communication unit 109 transmits an image to the communication unit 204 of the client apparatus 200 via the network 300.

The display unit 201 of the client apparatus 200 includes a monitor such as a liquid crystal display (LCD). In addition, the input unit 202 includes a pointing device such as a keyboard and a mouse. The user of the client apparatus 200 can input various commands by operating the input unit 202. The system control unit 203 performs display control of displaying, on the display unit 201, an image received from the camera 100 via the communication unit 204. In addition, the system control unit 203 outputs the above-described commands obtained via the input unit 202, to the communication unit 204 so as to transmit these commands to the camera 100. The communication unit 204 receives an image transmitted from the communication unit 109 of the camera 100 via the network 300, and transmits the received image to the system control unit 203. In addition, based on an instruction issued by the system control unit 203, the communication unit 204 transmits the above-described commands to the communication unit 109 of the camera 100 via the network 300.

Next, the encoding processing executed by the system control unit 103 of the camera 100 will be specifically described.

In the present exemplary embodiment, an encoding method that can control a generated code amount by controlling a parameter is used as the encoding processing. Specifically, the encoding method used in the present exemplary embodiment is compliant with the H.264/MPEG-4 AVC (ISO/IEC14496-10), according to which a generated code amount is controlled using a quantization parameter.

In addition, as code amount control, the system control unit 103 can use both of constant bit rate control (CBR control) and region-based image quality control. In this specification, the CBR control is control of determining a quantization parameter to be used in encoding, in such a manner that a generated code amount obtained by encoding an image becomes a target code amount. In addition, the region-based image quality control is control that can set different image quality for each specified region set within an image. Specifically, the region-based image quality control determines a quantization parameter in such a manner that the image quality of the inside of a specified region becomes higher image quality than the image quality of the outside of the specified region. By increasing the quantization parameter, a generated code amount can be reduced and the image quality can be made lower. In contrast, by decreasing the quantization parameter, a generated code amount can be increased and the image quality can be made higher.

A specified region set to have high image quality in the region-based image quality control can be pre-specified by the user from an imageable range by performing, for example, an imaging direction change and zoom control of the camera 100. For example, a specified region may be specified on a panoramic image generated based on a plurality of captured images obtained by performing an imaging direction change and zoom control of the camera 100. In the present exemplary embodiment, if the user sets a specified region and cancels the setting, the system control unit 103 can switch activation and deactivation of the region-based image quality control. In addition, in the following description, the region-based image quality control will be also referred to as a "region specifying function".

In addition, the switching between activation and deactivation of the CBR control can also be instructed by the user. When the CBR control and the region-based image quality control are both activated, the system control unit 103 determines a quantization parameter to be used in encoding, in such a manner that a generated code amount obtained by encoding an image becomes a target code amount, while maintaining the image quality set by the region-based image quality control. In other words, the system control unit 103 controls a code amount in such a manner as to keep a bit rate constant while varying the image quality between the inside and the outside of the specified region.

Figure 3:
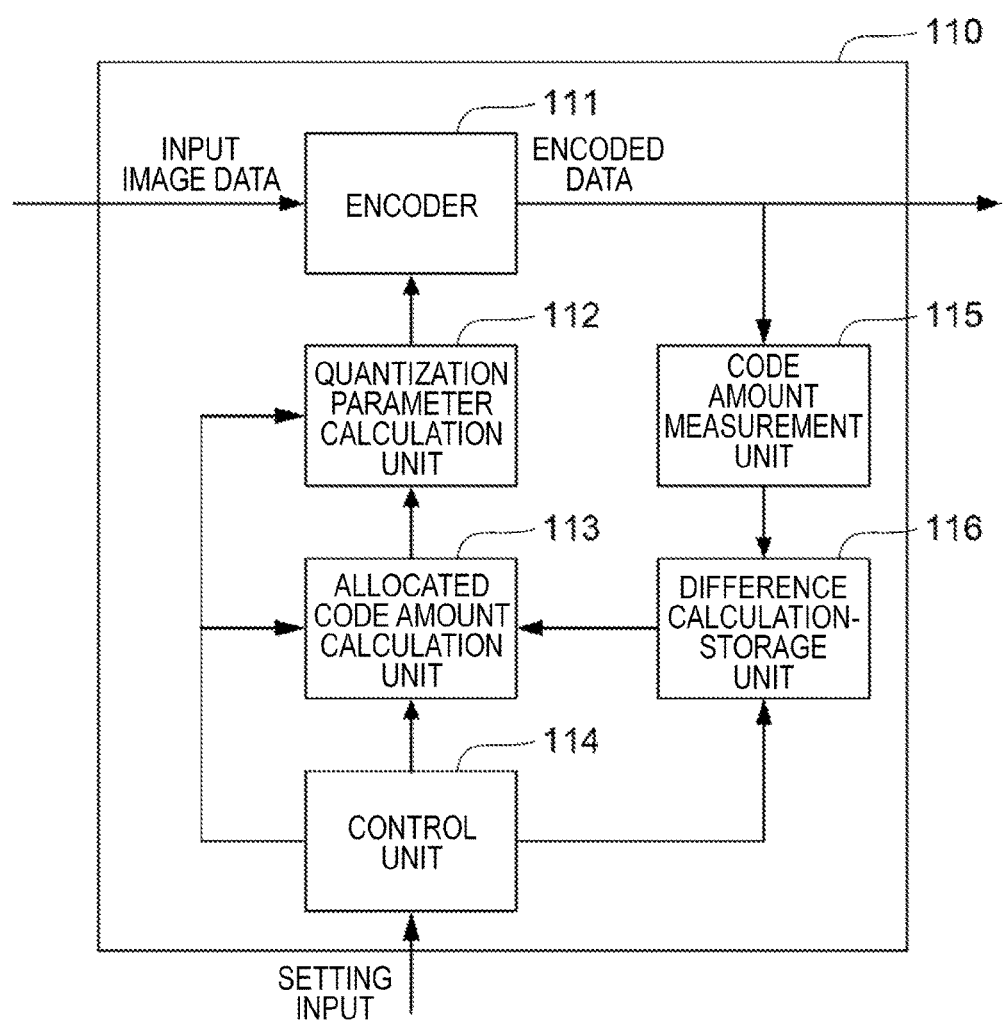
FIG. 3 is a block diagram illustrating a configuration example of an image encoding device.

FIG. 3 is a block diagram illustrating a configuration example of an image encoding device 110 included in the system control unit 103. The image encoding device 110 includes an encoder 111, a quantization parameter calculation unit 112, an allocated code amount calculation unit 113, a control unit 114, a code amount measurement unit 115, and a difference calculation-storage unit 116. The image encoding device 110 uses an image output from the image processing unit 102 in FIG. 2, as input image data, and performs encoding processing on the input image data by the encoder 111. The image encoding device 110 then outputs the encoded data.

The encoder 111 encodes an image using a quantization parameter given from the quantization parameter calculation unit 112. Then, the encoder 111 sets the encoded data as an output of the image encoding device 110, and outputs the encoded data to the code amount measurement unit 115.

The code amount measurement unit 115 measures a generated code amount of 1 frame (1 image), and outputs the measured generated code amount to the difference calculation-storage unit 116. The difference calculation-storage unit 116 calculates, as a code amount difference, an amount of difference between the generated code amount input from the code amount measurement unit 115, and a target code amount input from the control unit 114. Then, the difference calculation-storage unit 116 accumulates calculated amounts of differences to calculate an accumulated difference amount. Furthermore, the difference calculation-storage unit 116 stores the calculated accumulated difference amount into a storage unit such as a random access memory (RAM) 13 in FIG. 4, and outputs the calculated accumulated difference amount to the allocated code amount calculation unit 113.

Upon receiving a setting input to the image encoding device 110, the control unit 114 outputs various setting items to each unit in FIG. 3. These setting items include an accumulated difference range, a quantization parameter range, an input image size (the numbers of pixels in a horizontal direction and in a vertical direction of input image data), a frame rate, and an encoding method (intra-frame prediction encoding or inter-frame prediction encoding), aside from the above-described target code amount. In addition, the accumulated difference range may be calculated by the control unit 114 instead of being obtained as a setting input to the image encoding device 110.

The allocated code amount calculation unit 113 calculates a code amount to be allocated to the next image (an allocated code amount), based on encoding setting values including the target code amount, the frame rate, and the accumulated difference range that are input from the control unit 114, and the accumulated difference amount input from the difference calculation-storage unit 116. The allocated code amount calculation unit 113 outputs the calculated allocated code amount to the quantization parameter calculation unit 112.

Based on the input image size and the encoding method that are input from the control unit 114, the quantization parameter calculation unit 112 calculates a quantization parameter corresponding to the allocated code amount input from the allocated code amount calculation unit 113. The quantization parameter calculation unit 112 outputs the calculated quantization parameter to the encoder 111. The quantization parameter output to the encoder 111 is used in the encoding processing performed on the next input image data.

(Hardware Configuration)

Figure 4:
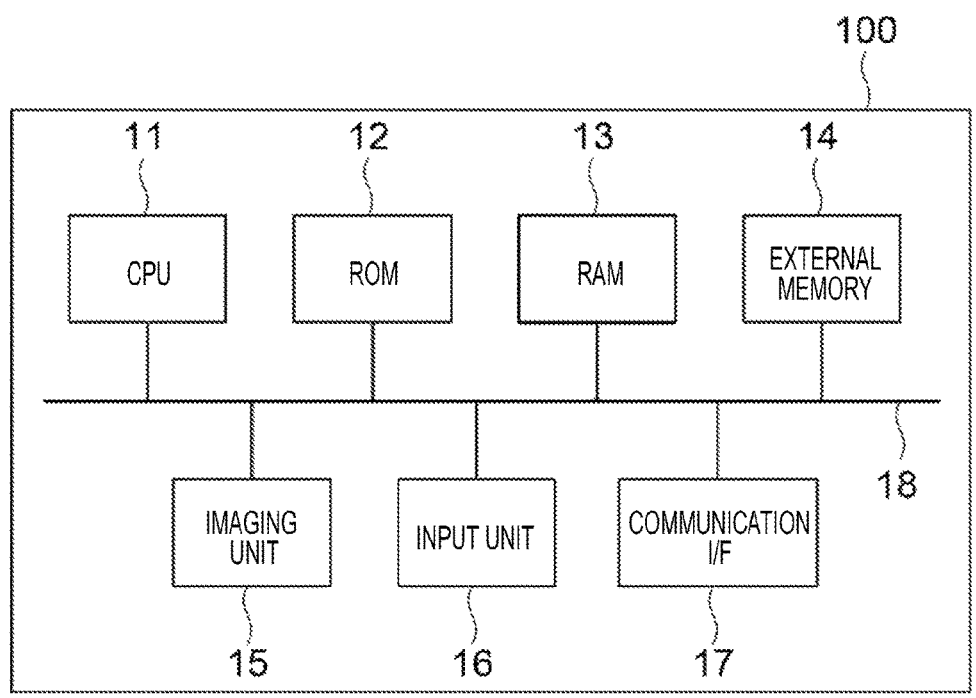
FIG. 4 illustrates a hardware configuration example of a network camera.

FIG. 4 illustrates a hardware configuration example of the camera 100.

As illustrated in FIG. 4, the camera 100 includes a central processing unit (CPU) 11, a read-only memory (ROM) 12, the RAM 13, an external memory 14, an imaging unit 15, an input unit 16, a communication I/F 17, and a system bus 18. The CPU 11 comprehensively controls operations in the camera 100, and controls each of the components (12 to 17) via the system bus 18. The ROM 12 is a nonvolatile memory storing a control program and the like that are necessary for the CPU 11 executing processing. In addition, the program may be stored in the external memory 14 or a detachable storage medium (not illustrated). The RAM 13 functions as a main memory, a work area, and the like of the CPU 11. More specifically, when executing processing, the CPU 11 loads a necessary program and the like from the ROM 12 into the RAM 13, and executes the program and the like to implement various functional operations. In addition, the camera 100 may be provided with a dedicated hardware configuration corresponding to the image encoding device 110.

The external memory 14 stores, for example, various types of data, various types of information, and the like that are necessary for the CPU 11 performing processing using the program. In addition, the external memory 14 stores, for example, various types of data, various types of information, and the like that have been obtained by the CPU 11 performing the processing using the program. The imaging unit 15 corresponds to the imaging unit 101 in FIG. 2. The input unit 16 includes a power button and the like. The communication I/F 17 corresponds to the communication unit 109 in FIG. 2. Part or all of the functions of the components of the camera 100 that are illustrated in FIGS. 2 and 3 can be implemented by the CPU 11 executing programs. Nevertheless, at least part of the components of the camera 100 that are illustrated in FIGS. 2 and 3 may be configured to operate as dedicated hardware. In this case, the dedicated hardware operates based on the control of the CPU 11.

In addition, the client apparatus 200 is provided with a hardware configuration corresponding to the display unit 201 in FIG. 2, in place of the imaging unit 15 in FIG. 4. In addition, the client apparatus 200 is provided with a hardware configuration corresponding to the input unit 202 in FIG. 2, as the input unit 16. Part or all of the functions of the components of the client apparatus 200 that are illustrated in FIG. 2 can be implemented by a CPU of the client apparatus 200 that corresponds to the CPU 11 executing programs. Nevertheless, at least part of the components of the client apparatus 200 that are illustrated in FIG. 2 may be configured to operate as dedicated hardware. In this case, the dedicated hardware operates based on the control of the CPU.

In the present exemplary embodiment, if the system control unit 103 confirms that the user has set a specified region, when the CBR control is deactivated and the region specifying function is deactivated, the system control unit 103 switches the state of the region specifying function to an activated state. At this time, the system control unit 103 sets a quantization parameter to be applied to the inside of the specified region set by the user, to a quantization parameter that had been applied to the entire image before the region specifying function is activated. Then, the system control unit 103 sets a quantization parameter to be applied to the outside of the specified region, to a value that makes the image quality lower than the previous image quality obtained from the quantization parameter that had been applied to the entire image before the region specifying function is activated. On the other hand, if the system control unit 103 confirms that the user has cancelled the setting of the specified region, when the CBR control is deactivated and the region specifying function is activated, the system control unit 103 switches the state of the region specifying function to a deactivated state. At this time, the system control unit 103 sets a quantization parameter to be applied to the entire image, to the quantization parameter that had been applied to the specified region before the region specifying function is deactivated. FIG. 8A illustrates an example of such a case. As illustrated in FIG. 8A, it is indicated that a quantization parameter (Q=30) is applied to the entire image before a specified region is activated. Then, after the specified region is activated, the quantization parameter (Q=30) is once set to the specified region, and a quantization parameter (Q=40) is set to the outside of the specified region. The respective quantization parameters of the specified region and the outside of the specified region may be preregistered by the user.

In addition, if the system control unit 103 activates the region specifying function when the CBR control is activated and the region specifying function is deactivated, the system control unit 103 changes the quantization parameter to be applied to the specified region immediately after the state of the region specifying function is switched to the activated state, to a preset fixed value. Furthermore, by setting the quantization parameter to be applied to the outside of the specified region, to a value that makes the image quality equal to or lower than the image quality obtained from the fixed value, the system control unit 103 prevents a code amount (bit rate) from instantaneously increasing. After that, based on a code amount generated in accordance with the set quantization parameters (the fixed value for the specified region, and the fixed value or a value equal to or less than the fixed value for the outside of the specified region), the system control unit 103 continues the CBR control. The generated code amount is assumed to fall below a target code amount. Thus, a quantization parameter that makes the image quality high is reset for the specified region in place of the above-described fixed value. In other words, by the CBR control, the quantization parameter of the specified region is set to a value that makes the image quality higher than the image quality obtained from the quantization parameter that had been applied to the entire image during the CBR control before the region specifying function is activated. In addition, the quantization parameter of the outside of the specified region is set to a value that makes the image quality lower than the image quality obtained from the quantization parameter that had been applied to the entire image during the CBR control before the region specifying function is activated. FIG. 8B illustrates an example of such a case. As illustrated in FIG. 8B, it is indicated that a quantization parameter (Q=30) is applied to the entire image before the specified region is activated. Then, immediately after the specified region is activated, a quantization parameter (Q=42) is once set for the specified region as a fixed value, and the quantization parameter (Q=42) is set for the outside of the specified region.

Furthermore, if the system control unit 103 deactivates the region specifying function when the CBR control is activated and the region specifying function is activated, the system control unit 103 changes a quantization parameter to be applied to the entire image immediately after the state of the region specifying function is switched to the deactivated state, to a preset fixed value, instead of a quantization parameter set for the specified region when the region specifying function is activated. Then, after that, the system control unit 103 performs the CBR control based on a code amount generated in accordance with the changed fixed value. More specifically, the system control unit 103 performs code amount control in such a manner that the generated code amount generated in accordance with the changed fixed value becomes a target code amount. In addition, if the specified region changes when the CBR control and the region specifying function are both activated, the system control unit 103 also once changes the quantization parameter to be applied to the specified region, to a preset fixed value. In this manner, the system control unit 103 determines whether there is a change in the setting of the specified region in the region specifying function. If the system control unit 103 determines that there is a change in the setting of the specified region, the system control unit 103 changes a quantization parameter to be used in encoding, to a preset fixed value. FIG. 8C illustrates an example of such a case. As illustrated in FIG. 8C, before the specified region is deactivated, a quantization parameter (Q=20) is set for the specified region, and a quantization parameter (Q=30) is set for the outside of the specified region. Then, immediately after the specified region is deactivated, a quantization parameter (Q=42), which is a fixed value, is once set to the entire image.

In the present exemplary embodiment, the camera 100 serving as an imaging apparatus operates as an image processing apparatus that can create encoded data to be transmitted to the client apparatus 200, by encoding an image. Alternatively, a device such as a PC that is connected to the imaging apparatus may operate as an image processing apparatus that can create encoded data to be transmitted to the client apparatus 200, by encoding an image obtained from the imaging apparatus.

An operation performed during the CBR control will be described below.

Figure 5:
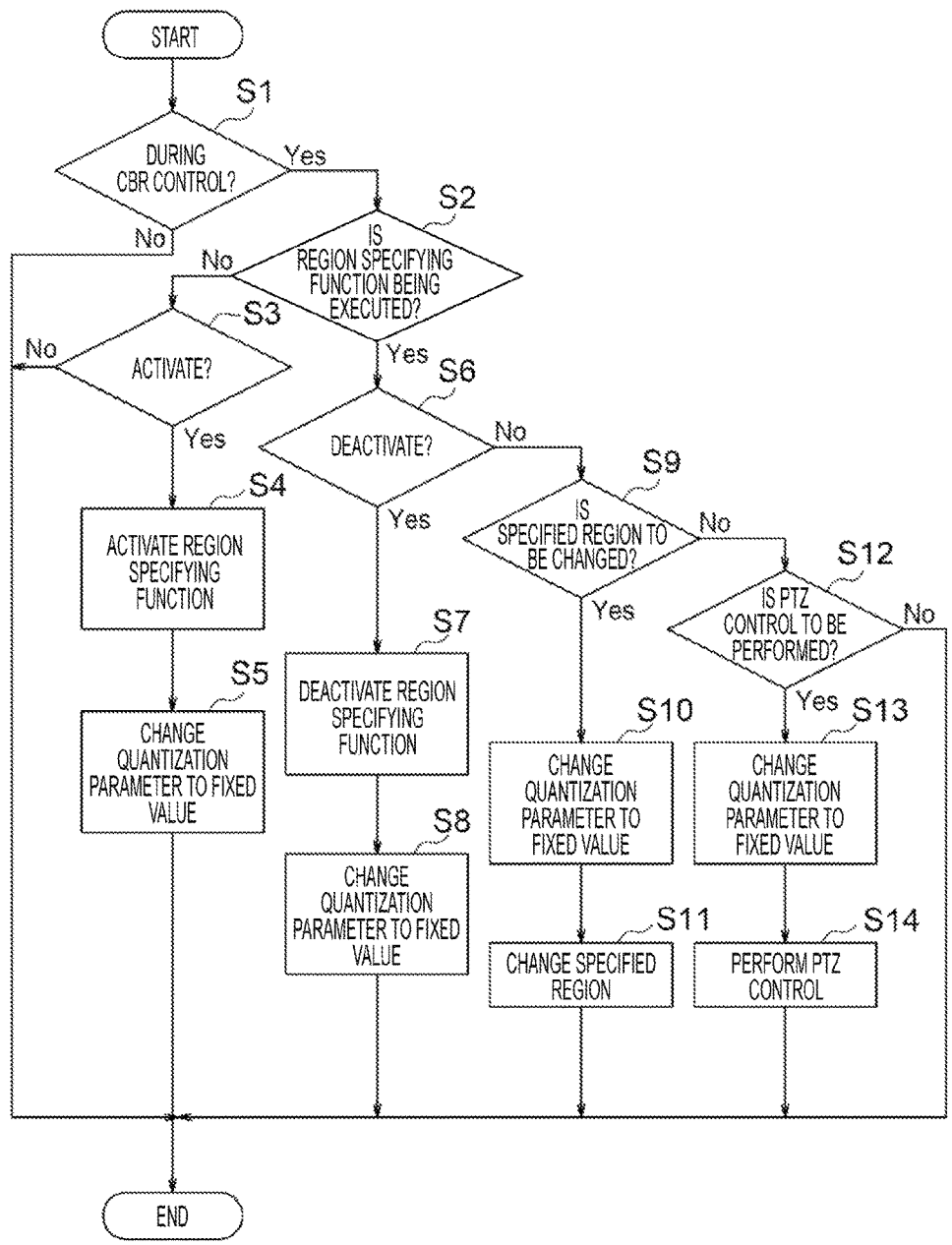
FIG. 5 is a flowchart illustrating an operation performed during CBR control according to a first exemplary embodiment.

FIG. 5 is a flowchart illustrating an operation performed by the system control unit 103 during the CBR control. The processing in FIG. 5 can be implemented by the CPU 11 of the camera 100 executing a program. First, in S1, the system control unit 103 determines whether it is during the CBR control. If the system control unit 103 determines that it is not during the CBR control (NO in S1) the system control unit 103 determines that there is no need for changing the setting of a quantization parameter, and ends the processing in FIG. 5. On the other hand, if the system control unit 103 determines that it is during the CBR control (YES in S1), the processing proceeds to S2, in which the system control unit 103 determines whether the region specifying function is being executed. Then, if the system control unit 103 determines that the region specifying function is not being executed (the region specifying function is deactivated) (NO in S2), the processing proceeds to S3. If the system control unit 103 determines that the region specifying function is being executed (the region specifying function is activated) (YES in S2), the processing proceeds to S6.

In S3, the system control unit 103 determines whether to activate the region specifying function. In S3, the system control unit 103 determines to activate the region specifying function, if an instruction issued from the user includes the setting of a specified region. Then, if the system control unit 103 determines to activate the region specifying function (YES in S3), the processing proceeds to S4. If the system control unit 103 determines to keep the region specifying function deactivated (NO in S3), the system control unit 103 directly ends the setting change processing. In S4, the system control unit 103 sets a specified region, and activates the region specifying function. Through the processing, a code amount control method becomes a control method that sets a quantization parameter of the specified region to a value that makes the image quality higher than the image quality obtained from a quantization parameter of the outside of the specified region. Next, in S5, the system control unit 103 once changes the quantization parameter of the specified region to a fixed value pre-stored in a storage unit. Specifically, the system control unit 103 controls the control unit 114 to output, to the quantization parameter calculation unit 112, a setting change instruction for setting the quantization parameter of the specified region to the above-described fixed value. After that, the system control unit 103 continues the CBR control based on a code amount generated in accordance with the set quantization parameters (the fixed value for the specified region, and the fixed value or a value equal to or less than the fixed value for the outside of the specified region). Even after the continuation of the CBR control, a quantization parameter to be reset for the specified region is set to a value that makes the image quality higher than the image quality obtained from the quantization parameter set for the outside of the specified region.

The above-described fixed value can be appropriately determined according to the use application of the camera 100. In addition, this fixed value is assumed to be a value verified as not leading to such a bit rate as to put pressure on the bandwidth of the network 300, or to such a bit rate as to cause a frame loss, even when being applied to the entire image. In this manner, the fixed value is assumed to be a quantization parameter with which a generated code amount becomes equal to or less than the maximum allowable code amount. Here, the maximum allowable code amount is a code amount that makes a bit rate the maximum bit rate, which is the maximum value that does not cause a defect such as the above-described pressure on the bandwidth and the frame loss. In other words, it can be said that the above-described defects do not occur if the generated code amount is equal to or less than the maximum allowable code amount.

An initial value of a quantization parameter that is set when the CBR control is started can be used as the fixed value. Alternatively, this fixed value can be set to a value corresponding to the lowest image quality (or corresponding to relatively low image quality) of a quantization parameter, or a value of a quantization parameter that had been applied to the entire image before the region specifying function is activated. If the fixed value is set to the value of the quantization parameter that had been applied to the entire image before the region specifying function is activated, a quantization parameter of the outside of the specified region is set to a value that makes the image quality equal to or lower than that obtained before the region specifying function is activated.

In S6, the system control unit 103 determines whether to deactivate the region specifying function. In S6, the system control unit 103 determines to deactivate the region specifying function, if an instruction issued from the user includes an instruction for cancelling the setting of the specified region. Then, if the system control unit 103 determines to deactivate the region specifying function (YES in S6), the processing proceeds to S7. If the system control unit 103 determines to keep the region specifying function activated (NO in S6), the processing proceeds to S9. In S7, the system control unit 103 cancels the setting of the specified region, and deactivates the region specifying function. Through the processing, the code amount control method becomes a control method that sets a quantization parameter of the entire image to a constant value. Next, in S8, the system control unit 103 once changes the quantization parameter of the entire image to a fixed value pre-stored in the storage unit. Specifically, the system control unit 103 controls the control unit 114 to output, to the quantization parameter calculation unit 112, a setting change instruction for setting the quantization parameter of the entire image to the above-described fixed value. Based on a code amount generated in accordance with the fixed value set as the quantization parameter, the system control unit 103 continues the CBR control, and resets the quantization parameter from the fixed value to a new value in such a manner as to obtain a target code amount.

The above-described fixed value can be appropriately determined according to the use application of the camera 100. In addition, this fixed value is assumed to be a value verified as not leading to such a bit rate as to put pressure on the bandwidth of the network 300, or to such a bit rate as to cause a frame loss, even when being applied to the entire image. The initial value of the quantization parameter that is set when the CBR control is started can be used as the fixed value. Alternatively, this fixed value can be set to a value corresponding to the lowest image quality (or corresponding to relatively low image quality) of a quantization parameter, or a value of a quantization parameter that had been applied to the outside of the specified region before the region specifying function is deactivated.

In S9, the system control unit 103 determines whether to change the specified region. In S9, the system control unit 103 determines to change the specified region, if an instruction issued from the user and received via the client apparatus 200 includes an instruction for changing an area of the specified region or an instruction for additionally setting a specified region. Then, if the system control unit 103 determines to change the specified region (YES in S9), the processing proceeds to S10. If the system control unit 103 determines not to change the specified region (NO in S9), the processing proceeds to S12. In S10, the system control unit 103 once changes the quantization parameter of the specified region to a fixed value pre-stored in the storage unit. Furthermore, by setting a quantization parameter to be applied to the outside of the specified region, to a value that makes the image quality equal to or lower than the image quality obtained from the fixed value, the system control unit 103 prevents a code amount (bit rate) from instantaneously increasing. Specifically, the system control unit 103 controls the control unit 114 to output, to the quantization parameter calculation unit 112, a setting change instruction for setting the quantization parameter of the specified region to the above-described fixed value. After that, the system control unit 103 continues the CBR control based on a code amount generated based on the set quantization parameters (the fixed value for the specified region, and the fixed value or a value equal to or less than the fixed value for the outside of the specified region). Even after the continuation of the CBR control, a quantization parameter to be reset for the specified region is set to a value that makes the image quality higher than the image quality obtained from the quantization parameter set for the outside of the specified region. The initial value of the quantization parameter that is set when the CBR control is started can be used as the above-described fixed value. Alternatively, the fixed value can be set to a value corresponding to the lowest image quality (or corresponding to relatively low image quality) of a quantization parameter, or a value of a quantization parameter that had been applied to the outside of the specified region before the specified region is changed. Next, in S11, the system control unit 103 changes the specified region to a specified region specified by the user.

Figure 9:
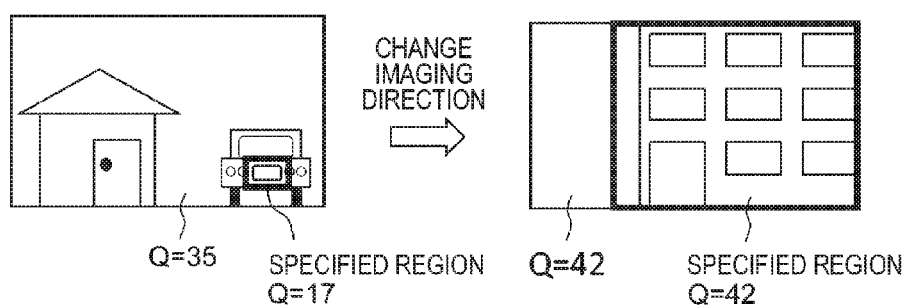
FIG. 9 is a diagram illustrating an example of a specified region.

In S12, the system control unit 103 determines whether an instruction received via the client apparatus 200 is an instruction for executing control of an imaging direction or a zoom magnification of the camera 100 (PTZ control). In S12, the system control unit 103 determines to execute the PTZ control, if the received instruction includes an instruction of the PTZ control. Then, if the system control unit 103 determines to execute the PTZ control (YES in S12), the processing proceeds to S13. If the system control unit 103 determines not to execute the PTZ control (NO in S12), the system control unit 103 directly ends the setting change processing. In S13, the system control unit 103 once changes the quantization parameter of the specified region to a fixed value pre-stored in the storage unit. Specifically, the system control unit 103 controls the control unit 114 to output, to the quantization parameter calculation unit 112, a setting change instruction for setting the quantization parameter of the specified region to the above-described fixed value. More specifically, if a viewing angle is changed according to the PTZ control of the camera 100, the size of the specified region within the viewing angle may increase. In this case, if the quantization parameter of the specified region is applied, the code amount is assumed to increase. Nevertheless, by once setting the quantization parameter of the specified region to the fixed value, the code amount can be prevented from increasing. FIG. 9 illustrates an example of such a case. As illustrated in FIG. 9, if an imaging direction of the camera is changed, a large-sized specified region may exist in a viewing angle obtained after the change. In this case, by once setting the quantization parameter of the specified region to a fixed value (Q=42), the code amount is prevented from increasing. In addition, an initial value of a quantization parameter that is set when the CBR control is started can be used as the above-described fixed value. Alternatively, this fixed value can be set to a value corresponding to the lowest image quality (or corresponding to relatively low image quality) of a quantization parameter, or a value of a quantization parameter that had been applied to the outside of the specified region before the PTZ control is executed. Next, in S14, the system control unit 103 executes the PTZ control by instructing the lens control unit 105 and the pan-tilt control unit 108 to perform pan, tilt, and zoom operations.

In this manner, in the present exemplary embodiment, if there is a change in the setting of the specified region in the region specifying function and the specified region changes, the quantization parameter is once changed to a preset fixed value. Specifically, if the setting of the specified region in the region specifying function is cancelled during the CBR control, or if a specified region is newly set in the region specifying function during the CBR control, it is determined that there is a change in the setting of the specified region. Furthermore, if an area of the specified region is changed or if at least one of an imaging direction and a viewing angle is changed (if the PTZ control is performed) during the CBR control and during the execution of the region specifying function, it is determined that there is a change in the setting of the specified region, as well. This can prevent a bit rate from instantaneously increasing too much. This point will be described below.

First, the consideration will be given to the case of activating the region specifying function during the CBR control. As region-based image quality control, there can be considered a control method of setting, when switching the state of the region specifying function to the activated state, the quantization parameter of the specified region to a value that makes the image quality higher than the previous image quality obtained from the quantization parameter that had been applied to the entire image before the region specifying function is activated. In this case, the larger the area of the specified region is, the larger the code amount is. Thus, depending on the area of the specified region, a bit rate may instantaneously become very large. This may cause the exceedance of an available bandwidth and a frame loss.

In contrast, in the present exemplary embodiment, in the case of activating the region specifying function during the CBR control, the quantization parameter of the specified region is once changed to a preset fixed value. In addition, as described above, this fixed value is assumed to be a value verified as not leading to such a bit rate as to put pressure on the bandwidth of the network 300 or to cause a frame loss, even when being applied to the entire image. In this manner, in the case of activating the region specifying function during the CBR control, the quantization parameter of the specified region is not set to a value that makes the image quality higher than the previous image quality obtained from the quantization parameter that had been applied to the entire image before the region specifying function is activated, but set to the above-described fixed value. Thus, a situation in which a bit rate rapidly increases when the state of the region specifying function is switched to the activated state can be avoided.

Next, the consideration will be given to the case of deactivating the region specifying function during the CBR control. As region-based image quality control, there can be considered a control method of setting, when switching the state of the region specifying function to the activated state, the quantization parameter of the outside of the specified region to a value that makes the image quality lower than the image quality obtained from the quantization parameter that had been applied to the entire image before the region specifying function is activated, without changing the quantization parameter of the specified region. In this case, by the CBR control performed after the region specifying function is activated, the quantization parameter of the specified region is set to a value that makes the image quality higher than the image quality obtained from the quantization parameter that had been applied to the entire image during the CBR control performed before the region specifying function is activated. In addition, the quantization parameter of the outside of the specified region is set to a value that makes the image quality lower than the image quality obtained from the quantization parameter that had been applied to the entire image during the CBR control performed before the region specifying function is activated. Then, the quantization parameter of the specified region is set to a value that makes the image quality higher as the area of the specified region is smaller. Thus, when the region specifying function is deactivated from this state, if the quantization parameter of the entire image is set to the quantization parameter that had been applied to the specified region before the region specifying function is deactivated, the quantization parameter of the entire image is switched to a value that makes the image quality very high. As a result, a bit rate instantaneously becomes very large.

In contrast, in the present exemplary embodiment, in the case of deactivating the region specifying function during the CBR control, the quantization parameter of the entire image is once changed to a preset fixed value. In addition, as described above, this fixed value is assumed to be a value verified as not leading to such a bit rate as to put pressure on the bandwidth of the network 300 or to cause a frame loss, even when being applied to the entire image. In this manner, in the case of deactivating the region specifying function during the CBR control, the quantization parameter of the entire image is not set to the quantization parameter that had been applied to the specified region before the region specifying function is deactivated, but set to the above-described fixed value. Thus, a situation in which a bit rate rapidly increases when the state of the region specifying function is switched to the deactivated state can be avoided.

Furthermore, if the user issues a change instruction for increasing the area of the specified region, or if the area of the specified region is increased by the PTZ control, a bit rate can instantaneously become very large even during the CBR control. Thus, in the present exemplary embodiment, if the specified region is changed or the PTZ control is performed during the CBR control and during the execution of the region specifying function, the quantization parameter of the specified region is once changed to a preset fixed value. In addition, as described above, this fixed value is assumed to be a value verified as not leading to such a bit rate as to put pressure on the bandwidth of the network 300 or to cause a frame loss, even when being applied to the entire image. With this configuration, a situation in which a bit rate rapidly increases due to a rapid increase in the area of the specified region having high image quality can be avoided.

As described above, in the present exemplary embodiment, a rapid increase in bit rate that is caused by large deviation of a generated code amount from a target code amount during the CBR control can be prevented. Thus, the occurrence of defects such as a frame loss can be prevented, and an image can be stably transmitted from the camera 100 to the client apparatus 200.

Second Exemplary Embodiment

Next, a second exemplary embodiment of the present invention will be described.

In the above-described first exemplary embodiment, when the specified region changes, the quantization parameter is once changed to a fixed value. In the second exemplary embodiment, when a specified region changes, a quantization parameter is changed to a fixed value, and an Intra picture (I picture) for performing intra-frame encoding is inserted.

Figure 6:
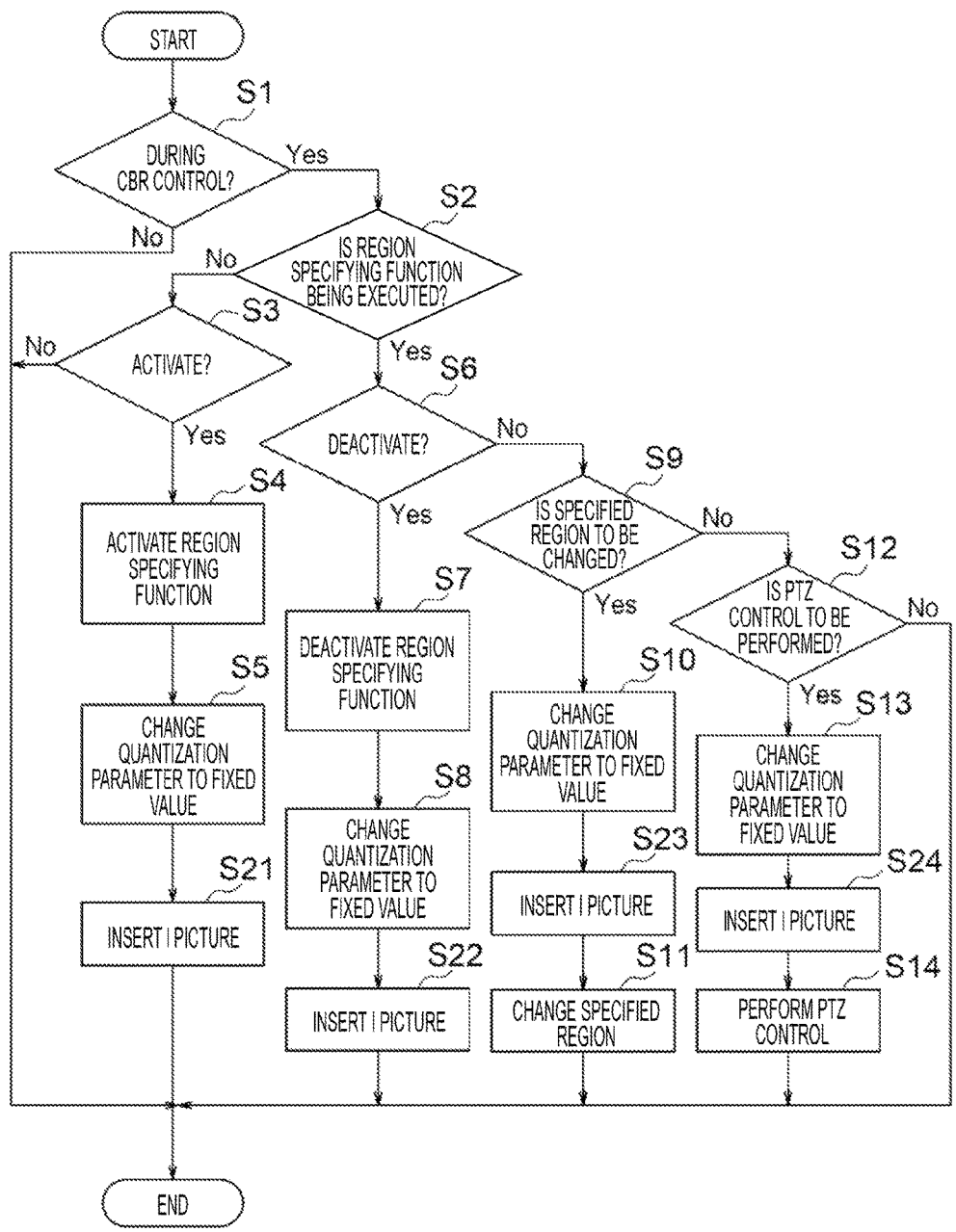
FIG. 6 is a flowchart illustrating an operation performed during CBR control according to a second exemplary embodiment.

FIG. 6 is a flowchart illustrating an operation performed by the system control unit 103 during the CBR control. The processing in FIG. 6 can be implemented by the CPU 11 of the camera 100 executing a program. The processing in FIG. 6 is similar to the processing in FIG. 5 except that S21 to S24 are added to the processing in FIG. 5. Thus, the following description will be mainly given of a different processing part.

Immediately after the system control unit 103 changes the quantization parameter of the specified region to the fixed value in S5, in S21, the system control unit 103 inserts an I picture. In the present exemplary embodiment, by inserting an I picture immediately after the quantization parameter is changed to the fixed value in this manner, the quantization parameter set to the fixed value is applied to the I picture.

Similarly, S22, S23 and S24 each corresponding to processing similar to S21 are also added immediately after S8, S10 and S13, and processing of adding an I picture is performed.

The types of images include an I picture, a Predictive picture (P picture), and a Bi-directional predictive picture (B picture). Among these types of images, only the I picture can be independently encoded within 1 image irrespective of preceding and succeeding images. Thus, the ratio of the I picture to a video size when viewed in a time axis becomes larger than the P picture and the B picture. In other words, in controlling a total video size using a quantization parameter, the most contributing image is the I picture. Thus, if an image to which the quantization parameter set to the fixed value is applied is an image other than the I picture, a supposed video size (code amount) may fail to be obtained.

In the present exemplary embodiment, an I picture for performing intra-frame encoding is inserted immediately after the quantization parameter is changed to the fixed value, and the quantization parameter set to the fixed value is applied to the I picture. With this configuration, a video size can be changed to a supposed size.

Third Exemplary Embodiment

Next, a third exemplary embodiment of the present invention will be described.

In the above-described first and second exemplary embodiments, when the specified region changes, the quantization parameter is set to the fixed value. In the third exemplary embodiment, when a specified region changes, a quantization parameter is changed to a value set according to the amount of change in the area of the specified region.

Figure 7:
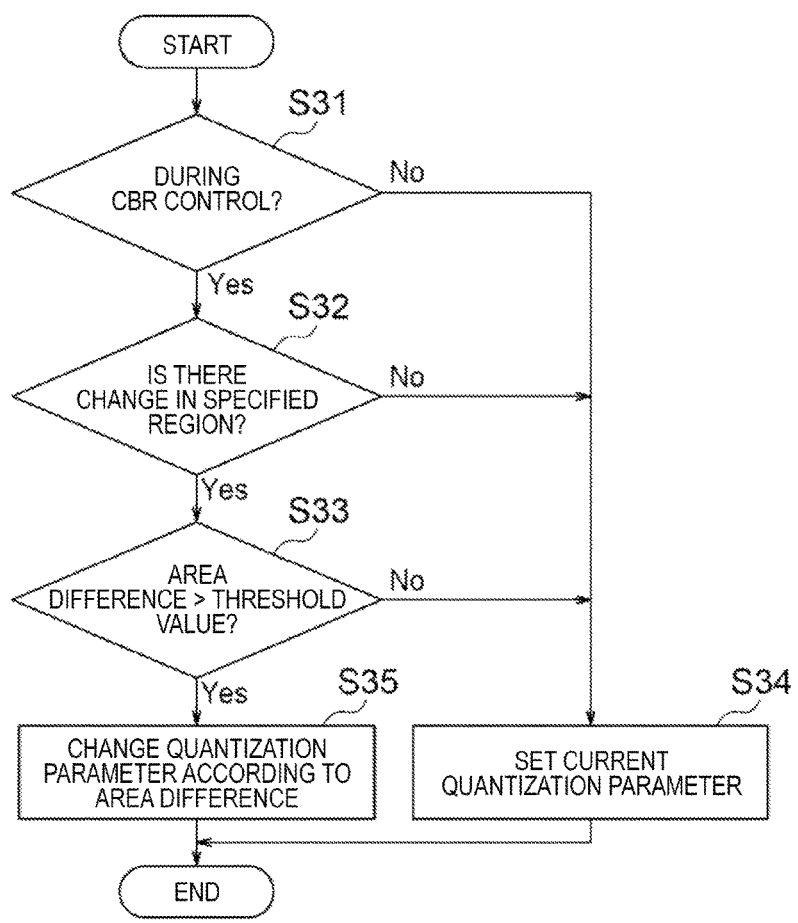
FIG. 7 is a flowchart illustrating an operation performed during CBR control according to a third exemplary embodiment.

FIG. 7 is a flowchart illustrating an operation performed by the system control unit 103 during the CBR control. The processing in FIG. 7 can be implemented by the CPU 11 of the camera 100 executing a program.

First, in S31, the system control unit 103 determines whether it is during the CBR control. If the system control unit 103 determines that it is not during the CBR control (NO in S31), the system control unit 103 directly ends the processing illustrated in FIG. 7. On the other hand, if the system control unit 103 determines that it is during the CBR control (YES in S31), the processing proceeds to S32, in which the system control unit 103 determines whether there is a change in the specified region. In the present exemplary embodiment, the system control unit 103 determines that the area of the specified region changes, when the activated/deactivated state of the region specifying function is switched, the area of the specified region is changed by the user, a specified region is added by the user, or the PTZ control is executed. Then, if the system control unit 103 determines that there is no change in the specified region (NO in S32), the system control unit 103 directly ends the processing illustrated in FIG. 7. If the system control unit 103 determines that the specified region changes (YES in S32), the processing proceeds to S33.

In S33, first, the system control unit 103 calculates a specified region area change amount (area difference). Specifically, the system control unit 103 calculates, as the specified region area change amount, a difference between the area of an unchanged specified region and the area of a changed specified region. In addition, in the case of switching the state of the region specifying function from the activated state to the deactivated state, the above-described change amount is calculated assuming that the area of the changed specified region is the area of the entire image. In addition, in the case of switching the state of the region specifying function from the deactivated state to the activated state, the above-described change amount is calculated assuming that the area of the unchanged specified region is 0. Then, the system control unit 103 compares the specified region area change amount with a pre-stored predetermined threshold value. If the specified region area change amount is equal to or less than the threshold value (NO in S33), the processing proceeds to S34. If the specified region area change amount exceeds the threshold value (YES in S33), the processing proceeds to S35. Here, the above-described predetermined threshold value can be determined according to the use application of the camera 100. This threshold value is set to an area difference verified as not leading to such a bit rate as to put pressure on the bandwidth of the network 300 or to cause a frame loss.

In S34, the system control unit 103 maintains a currently-set quantization parameter because there is no possibility of a rapid increase code amount. In addition, a normal quantization parameter may be set. Specifically, in the case of switching the state of the region specifying function from the activated state to the deactivated state, the system control unit 103 sets the quantization parameter of the entire image to the quantization parameter that had been applied to the specified region before the region specifying function is deactivated. In addition, in the case of switching the state of the region specifying function from the deactivated state to the activated state, the system control unit 103 sets the quantization parameter of the specified region to a value that makes the image quality higher than the previous image quality obtained from the quantization parameter that had been applied to the entire image before the region specifying function is activated. Furthermore, if the area of the specified region is changed or the PTZ control is performed when the region specifying function is activated, the quantization parameter of the changed specified region is set to remain at the quantization parameter of the unchanged specified region.

In S35, the system control unit 103 changes the quantization parameter according to the specified region area change amount. In the present exemplary embodiment, the system control unit 103 derives the quantization parameter corresponding to the area difference, by referring to a derived table having area differences on its horizontal axis and quantization parameters on its vertical axis. Specifically, in the derived table, a quantization parameter to be set when an area difference is equal to a threshold value is set to the above-described normally-applied value. In addition, a quantization parameter to be set when an area difference is equal to the area of the entire image is set as a fixed value, and a quantization parameter is set in such a manner as to linearly increase as the area difference increases. The initial value of the quantization parameter that is set when the CBR control is started may be used as the above-described fixed value. Alternatively, the fixed value may be set to a value corresponding to the lowest image quality (or corresponding to relatively low image quality) of a quantization parameter, or a value of the quantization parameter of the outside of the specified region. In addition, the method for deriving the quantization parameter is not limited to the above-described method. The various derivation methods can be used according to the features of the camera 100.

As described above, in the present exemplary embodiment, the system control unit 103 determines whether there is a change in the setting of the specified region, and changes a quantization parameter to be used in the encoding performed immediately after it is determined that there is a change in the setting of the specified region, according to the specified region area change amount. Specifically, the system control unit 103 performs processing of changing a quantization parameter from the normally-applied value, only if the specified region area change amount exceeds a predetermined threshold value. In addition, if the area change amount exceeds the predetermined threshold value, the system control unit 103 changes a quantization parameter to a value smaller than the fixed value (value that makes the image quality higher) as the area change amount is smaller. Thus, a rise in bit rate can be appropriately suppressed without deteriorating the image quality as far as possible.

In addition, in the above-described third exemplary embodiment, the description has been given of the case of changing the quantization parameter according to an area difference. Alternatively, if the specified region area change amount exceeds the predetermined threshold value, the quantization parameter may be changed to the fixed value irrespective of the above-described change amount. Also in this case, a rise in bit rate can be suppressed without unnecessarily deteriorating the image quality.

According to the above-described exemplary embodiments, in the case of executing the region-based image quality control during the CBR control, a rapid increase in bit rate that is caused by large deviation of a generated code amount from a target code amount can be prevented.

Other Exemplary Embodiments

The present invention can also be realized by the following processing. More specifically, a program for realizing one or more functions of the above-described exemplary embodiments is supplied to a system or an apparatus via a network or a storage medium, and one or more processors in a computer of the system or the apparatus read and execute the program. In addition, the present invention can also be realized by a circuit for realizing one or more functions (e.g., application specific integrated circuit (ASIC)).

More specifically, embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-153188, filed Aug. 3, 2015, which is hereby incorporated by reference herein in its entirety.

What is claimed is:

1. An image processing apparatus comprising:
   a setting unit configured to set, within an image, a specified region where a first quantization parameter is to be used, wherein the first quantization parameter makes an image quality of the specified region higher than an image quality of an outside of the specified region;
   a determination unit configured to perform processing to determine at least a second quantization parameter to be used in encoding of the outside of the specified region, to make a generated code amount obtained by encoding the image a target code amount; and
   a changing unit, wherein, in a case where the specified region is changed and the processing of the determination unit is activated, the changing unit is configured:
   to change a quantization parameter for the specified region from the first quantization parameter to a quantization parameter of a fixed value which is previously stored in a memory;
   to change a quantization parameter for the outside of the specified region from the second quantization parameter to the fixed value or a value which corresponds to an image quality lower than an image quality obtained from the fixed value; and
   to change the specified region after changing the quantization parameter for the specified region and the quantization parameter for the outside of the specified region,
   wherein the quantization parameter of the fixed value is a quantization parameter with which the generated code amount becomes equal to or less than a preset maximum allowable code amount.

2. The image processing apparatus according to claim 1, wherein the fixed value is an initial value of a quantization parameter that is determined by the determination unit.

3. The image processing apparatus according to claim 1, wherein the changing unit determines that the specified region is changed, in a case where a new specified region is added by the user.

4. The image processing apparatus according to claim 1, wherein the change of the specified region is a change of an area of the specified region.

5. The image processing apparatus according to claim 1, wherein the change of the specified region is a change of at least one of an imaging direction and a viewing angle of an imaging unit configured to capture the image.

6. The image processing apparatus according to claim 1, further comprising an encoding unit configured to encode the image using a quantization parameter,
   wherein, when the changing unit changes the quantization parameter for the specified region to the quantization parameter of the fixed value, the encoding unit inserts an I picture for performing intra-frame encoding.

7. The image processing apparatus according to claim 4, wherein, in a case in which an amount of change in an area of the specified region exceeds a predetermined threshold value, the changing unit changes the quantization parameter to the quantization parameter of the fixed value.

8. The image processing apparatus according to claim 1, wherein the changing unit changes the quantization parameter for the outside of the specified region to the quantization parameter of the fixed value.

9. The image processing apparatus according to claim 1, wherein the determination unit further determines a new quantization parameter based on a code amount of an image that is obtained after the changing unit has changed the quantization parameter to the quantization parameter of the fixed value.

10. The image processing apparatus according to claim 1, further comprising an imaging unit configured to capture the image.

11. An image processing method comprising:
    a setting step of setting, within an image, a specified region where a first quantization parameter is to be used, wherein the first quantization parameter makes an image quality of the specified region higher than an image quality of an outside of the specified region;
    a determination step of performing processing to determine at least a second quantization parameter to be used in encoding of the outside of the specified region, to make a generated code amount obtained by encoding the image a target code amount; and
    a changing step of, wherein, in a case where the specified region is changed and the processing of the determination step is activated, the changing step is configured:
    to change a quantization parameter for the specified region from the first quantization parameter to a quantization parameter of a fixed value which is previously stored in a memory;
    to change a quantization parameter for the outside of the specified region from the second quantization parameter to the fixed value or a value which corresponds to an image quality lower than an image quality obtained from the fixed value; and to change the specified region after changing the quantization parameter for the specified region and the quantization parameter for the outside of the specified region, wherein the quantization parameter of the fixed value is a quantization parameter with which the generated code amount becomes equal to or less than a preset maximum allowable code amount.

12. A non-transitory storage medium storing a program for causing a computer to execute an image processing method, the image processing method comprising:

a setting step of setting, within an image, a specified region where a first quantization parameter is to be used, wherein the first quantization parameter makes an image quality of the specified region higher than an image quality of an outside of the specified region;

a determination step of performing processing to determine at least a second quantization parameter to be used in encoding of the outside of the specified region, to make a generated code amount obtained by encoding the image a target code amount; and a changing step of, wherein, in a case where the specified region is changed and the processing of the determination step is activated, the changing step is configured:

to change a quantization parameter for the specified region from the first quantization parameter to a quantization parameter of a fixed value which is previously stored in a memory;

to change a quantization parameter for the outside of the specified region from the second quantization parameter to the fixed value or a value which corresponds to an image quality lower than an image quality obtained from the fixed value; and to change the specified region after changing the quantization parameter for the specified region and the quantization parameter for the outside of the specified region, wherein the quantization parameter of the fixed value is a quantization parameter with which the generated code amount becomes equal to or less than a preset maximum allowable code amount.

13. An image processing apparatus comprising:

a setting unit configured to set, within an image, a specified region where a first quantization parameter is to be used, wherein the first quantization parameter makes an image quality of the specified region higher than an image quality of an outside of the specified region;

a determination unit configured to perform processing to determine at least a second quantization parameter to be used in encoding of the outside of the specified region, to make a generated code amount obtained by encoding the image a target code amount;

an encoding unit configured to perform encoding using the first quantization parameter for the specified region; and a changing unit, wherein, in a case where the encoding using the first quantization parameter for the specified region is deactivated and the processing of the determination unit is activated, the changing unit is configured:

to change a quantization parameter for the specified region from the first quantization parameter to a quantization parameter of a fixed value which is previously stored in a memory;

to change a quantization parameter for the outside of the specified region from the second quantization parameter to the quantization parameter of the fixed value or a value which corresponds to an image quality lower than an image quality obtained from the quantization parameter of the fixed value; and to deactivate the encoding using the first quantization parameter for the specified region after changing the quantization parameter for the specified region and the quantization parameter for the outside of the specified region, wherein the quantization parameter of the fixed value is a quantization parameter with which the generated code amount becomes equal to or less than a preset maximum allowable code amount.

14. The image processing apparatus according to claim 13, wherein the fixed value is an initial value of a quantization parameter that is determined by the determination unit.

15. The image processing apparatus according to claim 13, wherein, when the changing unit changes the quantization parameter of the specified region to the quantization parameter of the fixed value, the encoding unit inserts an I picture for performing intra-frame encoding.

16. The image processing apparatus according to claim 13, wherein the changing unit changes the quantization parameter for the outside of the specified region to the quantization parameter of the fixed value.

17. The image processing apparatus according to claim 13, wherein the determination unit further determines a new quantization parameter based on a code amount of an image that is obtained after the changing unit has changed the quantization parameter to the quantization parameter of the fixed value.

18. The image processing apparatus according to claim 13, further comprising an imaging unit configured to capture the image.

19. An image processing method comprising:

setting, within an image, a specified region where a first quantization parameter is to be used, wherein the first quantization parameter makes an image quality of the specified region higher than an image quality of an outside of the specified region;

performing processing to determine at least a second quantization parameter to be used in encoding of the outside of the specified region, to make a generated code amount obtained by encoding the image a target code amount;

encoding using the first quantization parameter for the specified region; and wherein, in a case where the encoding using the first quantization parameter for the specified region is deactivated and the processing is activated, changing a quantization parameter for the specified region from the first quantization parameter to a quantization parameter of a fixed value which is previously stored in a memory;

to change a quantization parameter for the outside of the specified region from the second quantization parameter to the quantization parameter of the fixed value or a value which corresponds to an image quality lower than an image quality obtained from the quantization parameter of the fixed value; and to deactivate the encoding using the first quantization parameter for the specified region after changing the quantization parameter for the specified region and the quantization parameter for the outside of the specified region, wherein the quantization parameter of the fixed value is a quantization parameter with which the generated code amount becomes equal to or less than a preset maximum allowable code amount.

20. A non-transitory storage medium storing a program for causing a computer to execute and image processing method comprising:

setting, within an image, a specified region where a first quantization parameter is to be used, wherein the first quantization parameter makes an image quality of the specified region higher than an image quality of an outside of the specified region;

performing processing to determine at least a second quantization parameter to be used in encoding of the outside of the specified region, to make a generated code amount obtained by encoding the image a target code amount;

encoding using the first quantization parameter for the specified region; and wherein, in a case where the encoding using the first quantization parameter for the cpccifying specified region is deactivated and the processing is activated, changing a quantization parameter for the specified region from the first quantization parameter to a quantization parameter of a fixed value which is previously stored in a memory;

to change a quantization parameter for the outside of the specified region from the second quantization parameter to the quantization parameter of the fixed value or a value which corresponds to an image quality lower than an image quality obtained from the quantization parameter of the fixed value; and to deactivate the encoding using the first quantization parameter for the specified region after changing the quantization parameter for the specified region and the quantization parameter for the outside of the specified region, wherein the quantization parameter of the fixed value is a quantization parameter with which the generated code amount becomes equal to or less than a preset maximum allowable code amount.

* * * * *